United States Patent
Chen

[19]

[11] Patent Number: 6,159,099
[45] Date of Patent: Dec. 12, 2000

[54] PHOTOELECTRIC CONTROL UNIT OF A VIDEO CAR-RACING GAME MACHINE

[75] Inventor: Tao-Shen Chen, Tao Yuan, Taiwan

[73] Assignee: Can Technology Co., Ltd., Tao Yuan, Taiwan

[21] Appl. No.: 09/206,556

[22] Filed: Dec. 8, 1998

[51] Int. Cl.[7] .................................................. A63F 9/22
[52] U.S. Cl. .................................. 463/37; 463/36; 463/6; 273/148 B; 434/62
[58] Field of Search ..................................... 463/6, 36, 37, 463/63, 38, 39; 345/184; 273/148 B; 434/30, 62–72; 446/454, 456, 460, 464, 468

[56] References Cited

U.S. PATENT DOCUMENTS

| | | | |
|---|---|---|---|
| 4,919,003 | 4/1990 | Lawson et al. | 74/471 X |
| 4,949,119 | 8/1990 | Moncrief et al. | 273/148 B |
| 5,056,787 | 10/1991 | Mitsuyoshi | 273/148 B |
| 5,558,329 | 9/1996 | Liu | 273/148 B |
| 5,796,354 | 8/1998 | Cartabiano et al. | 341/22 |
| 5,971,853 | 10/1999 | Kataoka et al. | 463/36 |

*Primary Examiner*—Michael O'Neill
*Assistant Examiner*—Yveste G Cherubin
*Attorney, Agent, or Firm*—Rosenberg, Klein & Lee

[57] ABSTRACT

A photoelectric control unit installed in a video game machine and operated to control the motion of a controlled object in the screen of a display unit of the video game machine, the photoelectric control unit including a housing, a steering column installed in the housing and rotated with a steering wheel, a torsional spring mounted on the steering column, the torsional spring having one end fixedly fastened to the steering column and an opposite end fixedly connected to a fixed spring holder inside the housing, and a photoelectric controller formed of an optical transmitter and detector assembly and a signal processing circuit board for detecting rotary motion of the steering column and outputting to the display unit of the video game machine a signal indicative of rotary motion of the steering column.

4 Claims, 6 Drawing Sheets

PHOTOELECTRIC CONTROL UNIT OF A VIDEO CAR-RACING GAME MACHINE

BACKGROUND OF THE INVENTION

The present invention relates to video game machines, and more specifically to a photoelectric control unit for a video car-racing game machine.

The control unit of a conventional video car-racing game machine is generally comprised of a housing, a steering column installed in the housing and rotated with a steering wheel, an elastic band or spring means connected between the steering column and a part of the housing, which automatically returns the steering column to its former position after each rotary motion of the steering column, and a variable resistor, which detects rotary motion of the steering column and, outputs a signal indicative of the direction and amount of rotary motion of the steering column. This structure of control unit has numerous drawbacks as outlined hereinafter.
1. The elastic band or spring means wears quickly with use. When the elastic band or spring means starts to wear, an elastic fatigue problem occurs, causing the steering column unable to be accurately returned to its former position.
2. The service life of the variable resistor is short, and the variable resistor tends to an inaccurate output signal upon a friction force.
3. The whole design of the control unit is not orthopedically engineered for a comfortable use, and the whole structure tends to be broken or damaged.

SUMMARY OF THE INVENTION

It is one object of the present invention to provide a photoelectric control unit for a video game machine which uses an optical transmitter and detector assembly and a signal processing circuit board to detect the direction of amount of movement of the steering column or reciprocating shaft and, to output a corresponding output signal indicative of the direction of amount of movement of the steering column or reciprocating shaft. It is another object of the present invention to provide a photoelectric control unit for a video game machine which is durable and comfortable in use.

DETAILED DESCRIPTION OF THE PREFERRED EMBODIMENT

Figure 1:
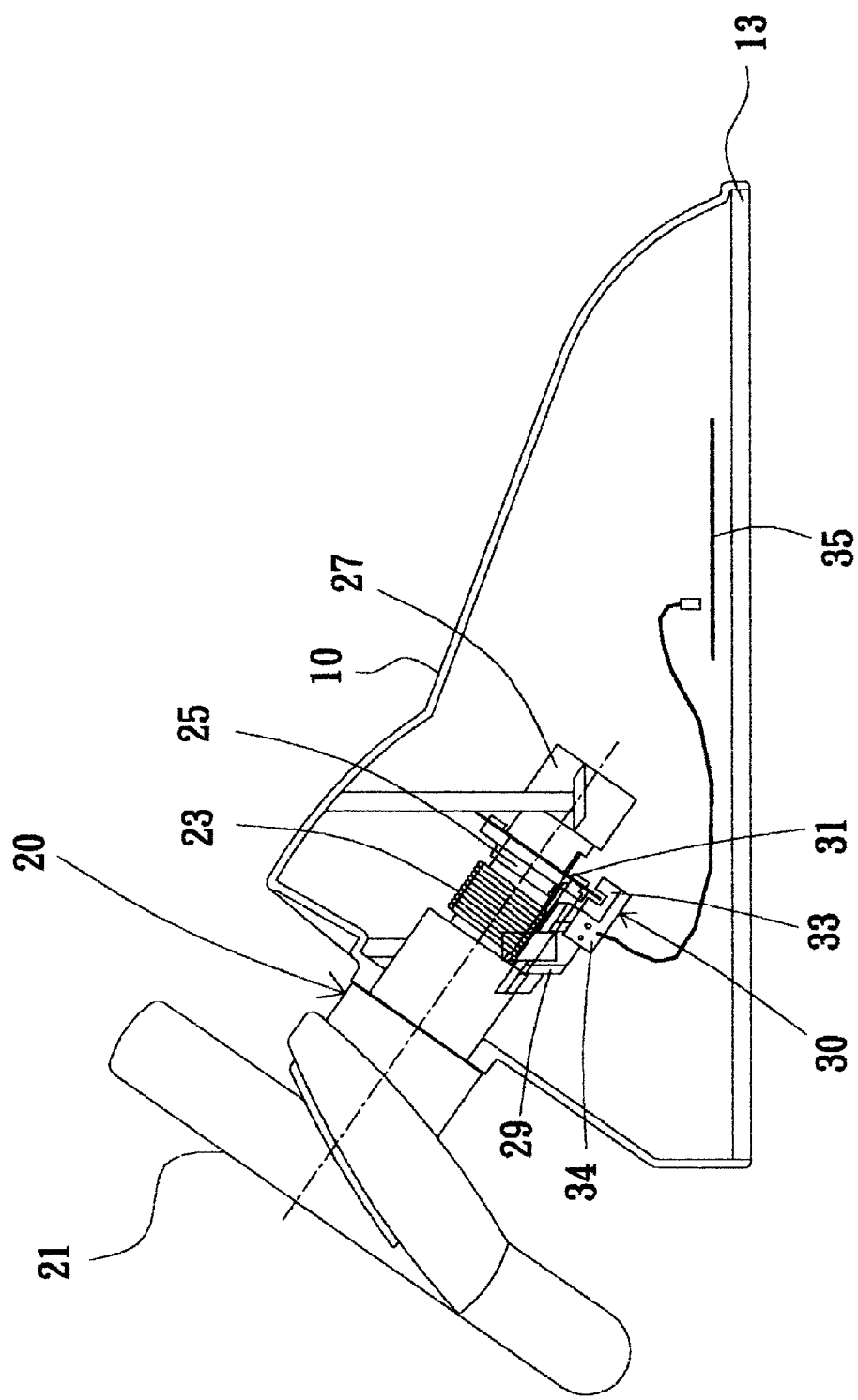
FIG. 1 is a sectional view of a photoelectric control unit according to a first embodiment of the present invention.
Figure 2:
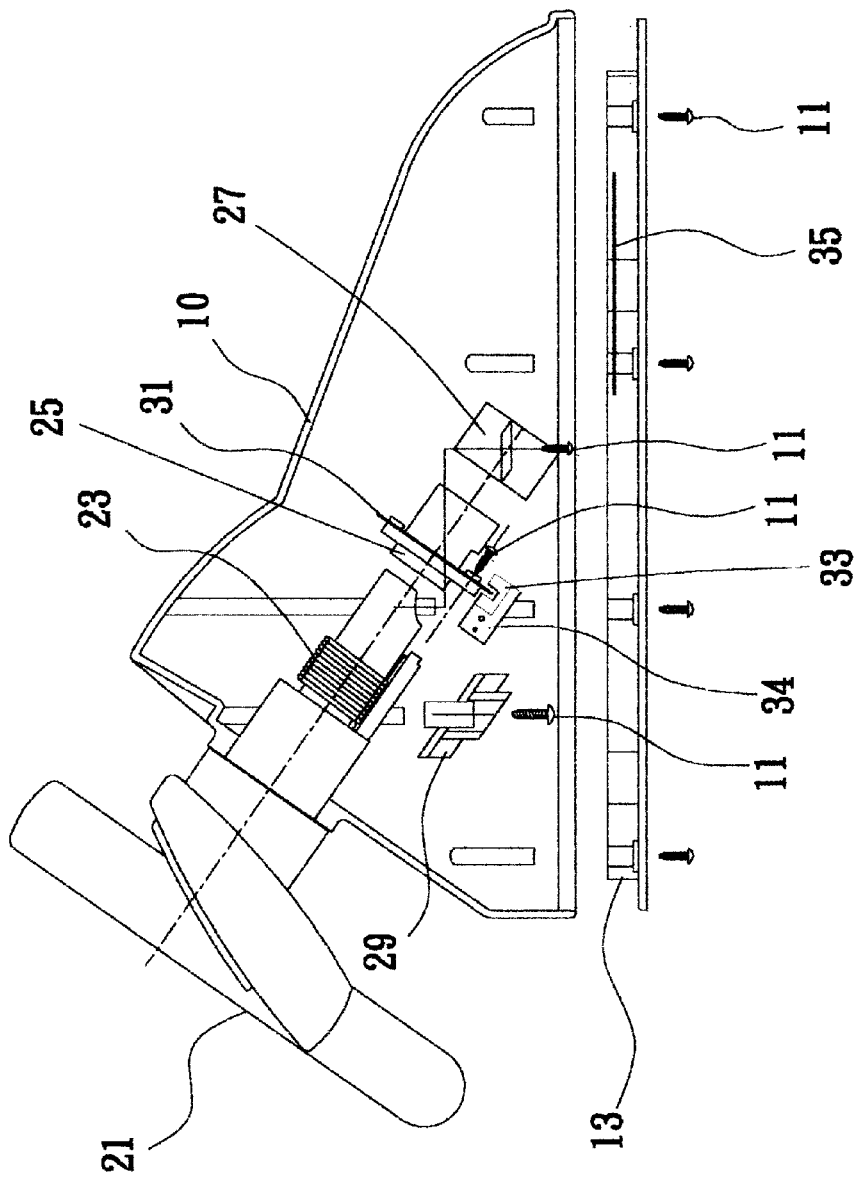
FIG. 2 is an exploded view in section of the photoelectric control unit shown in FIG. 1.

Referring to FIGS. 1 and 2, a photoelectric control unit of a video car-racing game machine in accordance with the present invention is shown comprised of a housing 10, a steering column 20, and a photoelectric controller 30.

Figure 3:
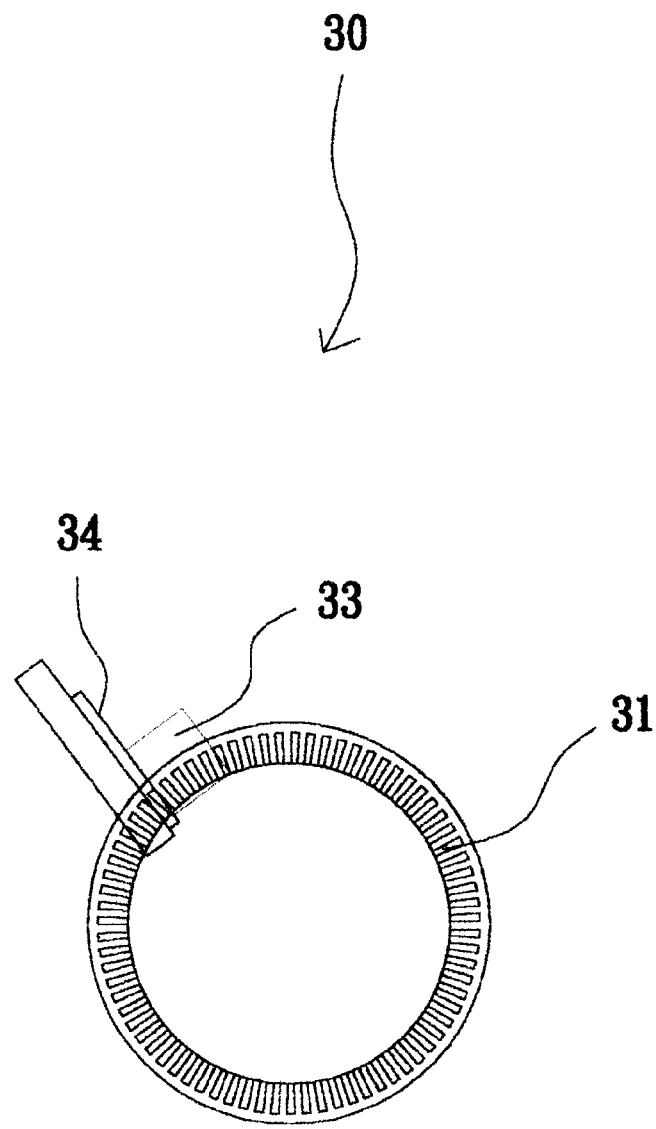
FIG. 3 is an enlarged view of a part of FIG. 1, showing the arrangement of the photoelectric controller.

Referring to FIG. 3 and FIGS. 1 and 2 again, the housing 10 has a bottom open side covered with a bottom cover 13. The steering column 20 is inserted through a hole (not shown) on the housing 10, and revolvably supported in an axle holder 27, which is fixedly fastened to the inside wall of the housing 10. A steering wheel 21 is fixedly fastened to one end, namely, the outer end of the steering column 20 outside the housing 10. A bushing 25 is fixedly mounted around the steering column 20. A spring holder 29 is fixedly fastened to the inside wall of the housing 10, and stopped at the front end of the bushing 25. Because the bushing 25 is fixedly fastened to the steering column 20 and stopped against the spring holder 29, the steering column 20 is prohibited from being pulled out of the housing 20. A torsional spring 23 is mounted around the steering column 20 inside the housing 10, having one end fixedly fastened to the steering column 20 and an opposite end fixedly connected to the spring holder 29. When the steering column 20 is rotated with the steering wheel 21 in one direction, the torsional spring 23 is compressed. When the steering wheel 21 is released, the steering column 20 is immediately rotated in the reversed direction to its former position by the spring force of the torsional spring 23. The photoelectric controller 30 comprises an optical encoder wheel 31 fixedly mounted around the bushing 25, an optical transmitter unit 33 and an optical detector unit 34 are mounted inside the housing 10, and disposed at two opposite sides relative to the optical encoder wheel 31, and a signal processing circuit board 35 fixedly mounted on the bottom cover 13. The signal processing circuit board 35 has a signal input end connected to the optical detector unit 34 to receive signal from it, and a signal output end connected to the display unit of the video game machine (not shown) to control the steering of the racing car in the screen of the display unit. The optical encoder wheel 31 has a plurality of peripheral notches equiangularly spaced around the periphery for inducing a signal. The optical encoder wheel 31 is read by the optical detector unit 34 which, in turn, read a light beam transmitted by the optical transmitter unit 33. When the steering wheel 31 is rotated, the encoder wheel 31 is rotated synchronously with the bushing 25 and the steering column 20, and the direction and amount of rotation of the encoder wheel 31 is detected by the optical detector unit 34, causing the optical detector unit 34 to output an analog signal indicative of rotary motion of the steering wheel 21, the analog signal is processed by the signal processing circuit board 35 into a corresponding digital signal to control the movement of the racing car in the screen of the display unit of the video game machine. According to this embodiment, screws 11 are used to fix the bushing 25 to the steering column 20, the axle holder 27 and the spring holder 29 to the housing 10, and the signal processing circuit board 35 to the bottom cover 13.

Figure 4:
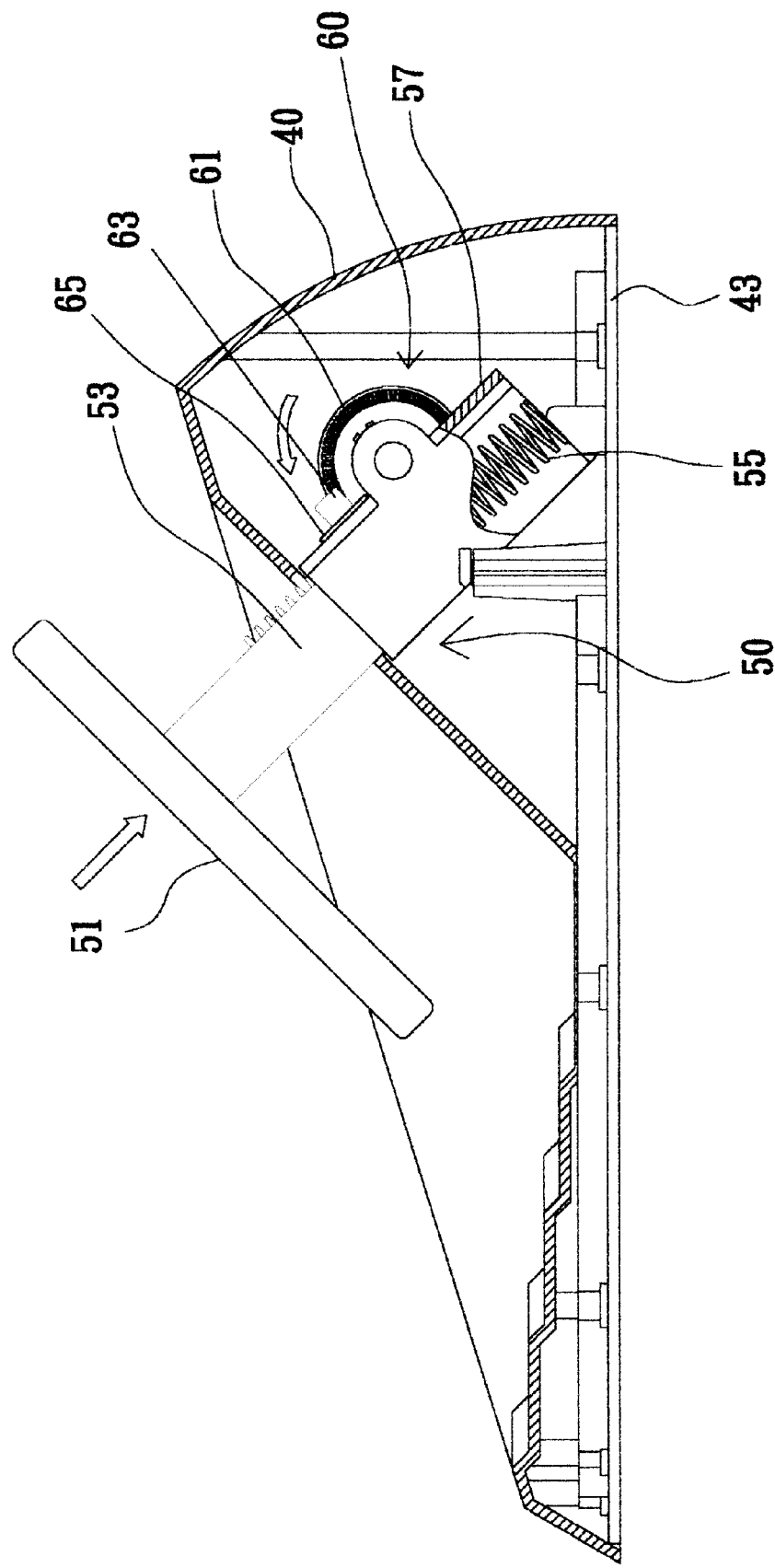
FIG. 4 is a sectional view of a photoelectric control unit according to a second embodiment of the present invention.
Figure 5:
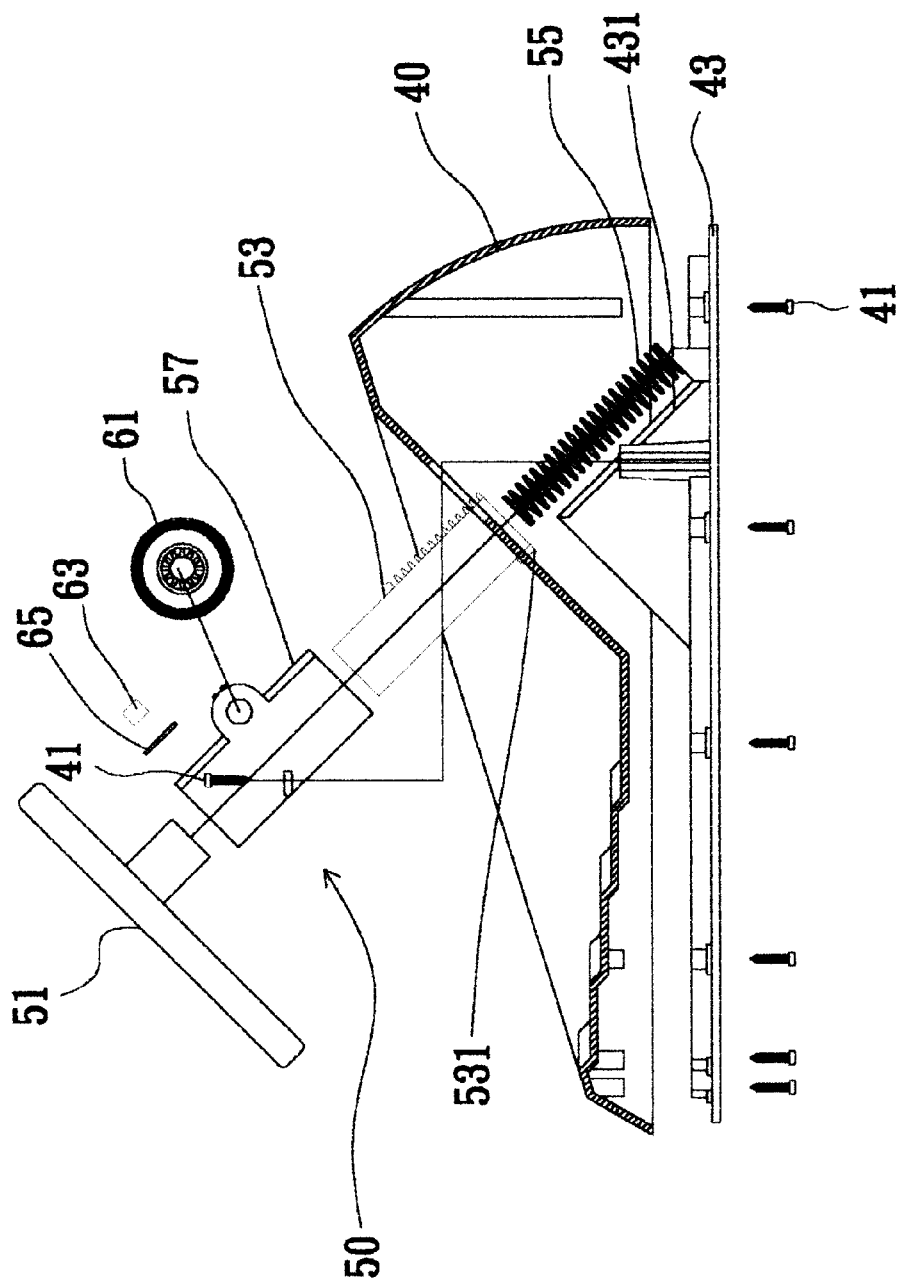
FIG. 5 is an exploded view in section of the photoelectric control unit shown in FIG. 4.

FIGS. 4 and 5 show an alternate form of the present invention. According to this embodiment, the photoelectric control unit comprises a housing 40, a reciprocating shaft 50, and a photoelectric controller 60. The housing 40 has a bottom open side covered with a bottom cover 43. The bottom cover 43 has an oblique guide groove 431 for guiding reciprocating motion of the reciprocating shaft 50. The reciprocating shaft 50 comprises a rack 53 inserted through a hole on the housing 40 and moved forwards/backwards along the guide groove 431, the rack 53 has a locating rib 531 raised from the periphery, which is inserted into the guide groove 431 to guide reciprocating motion of the rack 53, a pedal 51 fixedly fastened to one end, namely, the top end of the rack 53 outside the housing 40, a compression spring 55 having one end connected to one end, namely, the bottom end of the rack 53 and an opposite end connected to the bottom cover 43. Further, a holder frame 57 is fixedly fastened to the bottom cover 43 to support the rack 53 and, to guide reciprocating motion of the rack 53. Further, screws 41 are installed to fix the holder frame 57 to the bottom cover 43 and, the bottom cover 43 to the housing 40. The photoelectric controller 60 is comprised of a toothed encoder wheel 61 revolvably supported on the holder frame 57 and meshed with the rack 55, an optical transmitter and detector assembly 63 and a signal processing circuit board 65 respectively fixedly fastened to the holder frame 57 to detect rotary motion of the encoder wheel 61.

Figure 6:
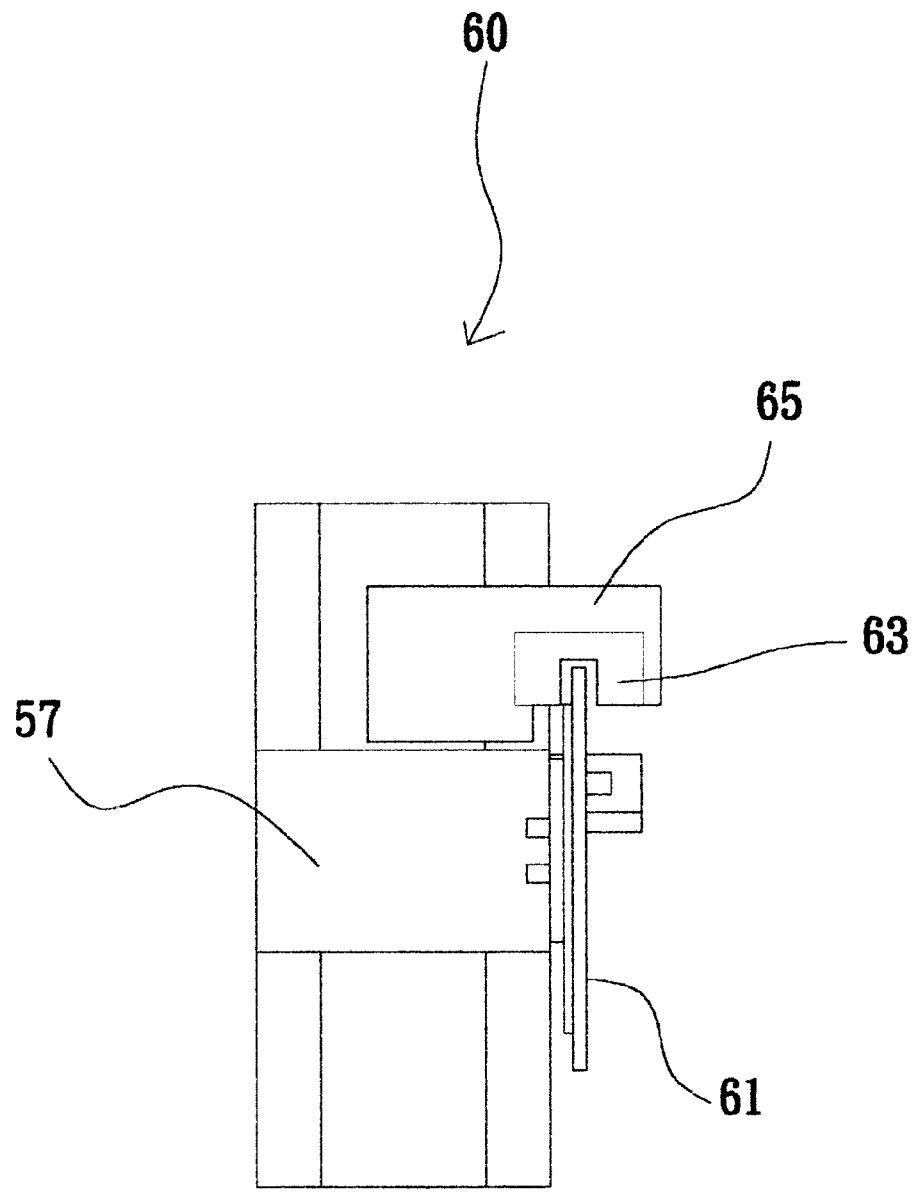
FIG. 6 is an enlarged view of a part of FIG. 3, showing the arrangement of the photoelectric controller.

Referring to FIG. 6 and FIG. 4 again, the optical transmitter and detector assembly 63 is comprised of an optical transmitter unit and an optical detector unit. When the pedal 51 is operated with the foot to reciprocate the reciprocating shaft 53, the encoder wheel 61 is synchronously rotated. When the rack 53 is forced downwards, the encoder wheel 61 is rotated in one direction. On the contrary, when the rack 53 is pushed upwards by the spring force of the compression spring 55, the encoder wheel 61 is rotated in the reversed direction. The direction and amount of rotation of the encoder wheel 61 is detected by the optical transmitter and detector assembly 63, causing it to output an analog signal to the signal processing circuit board 65. The analog signal from the optical transmitter and detector assembly 63 is then processed by the signal processing circuit board 65 into a corresponding digital signal to control the motion of the controlled object in the screen of the display unit of the video game machine.

It is to be understood that the drawings are designed for purposes of illustration only, and are not intended as a definition of the limits and scope of the invention disclosed.

What the invention claimed is:

1. A photoelectric control unit installed in a video game machine and operated to control the motion of a controlled object in the screen of a display unit of the video game machine, the photoelectric control unit comprising:

a housing comprising a bottom cover, and an axle holder fixedly mounted on an inside wall thereof;

a steering column mounted in said housing column having a bottom end supported in said axle holder and a top end extended out of said housing;

a steering wheel fixedly fastened to the top end of said steering column, and operated to rotate said steering column in said housing;

a bushing fixedly mounted on said steering column;

a spring holder fixedly fastened to the inside wall of said housing and stopped at a front end of the bushing;

a torsional spring mounted around said steering column inside said housing, said torsional spring having one end fixedly fastened to said steering column and an opposite end fixedly connected to said spring holder; and a photoelectric controller for detecting rotary motion of said steering column and outputting to the display unit of the video game machine a signal indicative of rotary motion of said steering column, said photoelectric controller comprising an optical encoder wheel fixedly mounted around said bushing and rotated with said steering column, an optical transmitter and detector assembly mounted inside said housing to detect rotary motion of said encoder wheel and to output a corresponding analog signal, and a signal processing circuit board fixedly mounted inside said housing and connected to said optical transmitter and detector assembly to receive the analog signal from said optical transmitter and detector assembly and, to process the received analog signal into a digital signal indicative of rotary motion of said steering wheel for controlling the motion of the controlled object in the screen of the display unit of the video game machine.

2. The photoelectric control unit of claim 1 wherein said encoder wheel has a plurality of peripheral notches equiangularly spaced around the periphery.

3. A photoelectric control unit installed in a video game machine and operated to control the motion of a controlled object in the screen of a display unit of the video game machine, the photoelectric control unit comprising:

a housing having a bottom open side covered with a bottom cover;

a rack inserted through a hole on said housing and reciprocated in said housing, said rack having a top end extended out of said housing, and a bottom end;

a pedal fixedly fastened to the top end of said rack outside said housing and operated with the foot to move said rack up and down;

a compression spring connected between said rack and said bottom cover to impart an upward pressure to said rack;

a holder frame fixedly fastened to said bottom cover to support said rack and, to guide reciprocating motion of said rack; and a photoelectric controller for detecting reciprocating motion of said rack and outputting to the display unit of the video game machine a signal indicative of reciprocating motion of an encoder wheel, said photoelectric controller comprising a toothed encoder wheel revolvably supported on said holder frame and meshed with said rack, an optical transmitter and detector assembly fixedly mounted on said holder frame to detect rotary motion of said encoder wheel and to output a corresponding analog signal, and a signal processing unit fixedly mounted inside said housing to receive the analog signal from said optical transmitter and detector assembly and, to process the received analog signal into a digital signal indicative of reciprocating motion of said rack for controlling the motion of the controlled object in the screen of the display unit of the video game machine.

4. The photoelectric control unit of claim 3 wherein said bottom cover has an oblique guide groove for guiding the reciprocating motion of said rack; said rack has a locating rib raised from the periphery thereof, which is inserted into said guide groove to guide reciprocating motion of said rack in said guide groove.

\* \* \* \* \*